United States Patent
Lee et al.

(10) Patent No.: US 10,956,357 B2
(45) Date of Patent: Mar. 23, 2021

(54) METHOD FOR FLEXIBLE, FAST ALL-REDUCE ON ARBITRARY TREE TOPOLOGY

(71) Applicant: INTERNATIONAL BUSINESS MACHINES CORPORATION, Armonk, NY (US)

(72) Inventors: Jinho Lee, Austin, TX (US); Soham Shah, Austin, TX (US); Minsik Cho, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/371,536

(22) Filed: Apr. 1, 2019

(65) Prior Publication Data
US 2020/0311016 A1    Oct. 1, 2020

(51) Int. Cl.
*G06F 15/173*    (2006.01)
*G06F 9/38*    (2018.01)
*G06F 9/50*    (2006.01)
*G06T 1/20*    (2006.01)

(52) U.S. Cl.
CPC ...... *G06F 15/17356* (2013.01); *G06F 9/3877* (2013.01); *G06F 9/5077* (2013.01); *G06T 1/20* (2013.01)

(58) Field of Classification Search
CPC ............. G06F 15/17356; G06F 9/3877; G06F 9/5077; G06T 1/20
USPC ........................................................ 709/201
See application file for complete search history.

(56) References Cited

U.S. PATENT DOCUMENTS

| 6,587,852 | B1* | 7/2003 | Svingen | G06F 16/90344 |
| 6,760,744 | B1* | 7/2004 | Halaas | G06F 15/17343 |
| | | | | 709/201 |
| 8,484,440 | B2 | 7/2013 | Faraj | |
| 2004/0083475 | A1* | 4/2004 | Todd | G06F 9/5005 |
| | | | | 718/102 |
| 2011/0271263 | A1* | 11/2011 | Archer | G06F 8/45 |
| | | | | 717/149 |

(Continued)

OTHER PUBLICATIONS

Anonymous, "An Apparatus for leveraging General Purpose Graphics Processing Units for JSON Acceleration in Front-End Cache" IPCOM000234730D, Jan. 31, 2014.

(Continued)

*Primary Examiner* — Tauqir Hussain
(74) *Attorney, Agent, or Firm* — Edward Li

(57) ABSTRACT

A method for sending data across processors to combine the data on the processors is described. In one embodiment, a method includes receiving a set of data at a set of processors configured in an asymmetric or symmetric tree topology including a root and one or more leaves. Target portions of the set of data are assigned to processors of the set of processors based on a number of child processors that are connected to a parent node. The method includes sending iteratively apportioned combined data between child processors sharing the same parent node in each branch of the tree topology starting from the one or more leaves and increasing levels in the tree topology until reaching the root. The method also includes sending the combined data between child processors from one branch to child processors in at least one other branch.

18 Claims, 12 Drawing Sheets

(56) References Cited

U.S. PATENT DOCUMENTS

2017/0228645 A1    8/2017  Wang et al.
2017/0300830 A1   10/2017  Kadav et al.

OTHER PUBLICATIONS

Anonymous, "Topology-Aware Resource Allocation in Multi-GPU Architecture" IPCOM000247369D, Aug. 29, 2014.
Anonymous, "Recognizing Semantic Formatting Information in a Document" IPCOM000251990D Dec. 13, 2017.
Minsik Cho et al. "BlueConnect: Novel Hierarchical All-Reduce on Multi-tired Network for Deep Learning" IBM PowerAI DDL; 32nd Conference on Neural Information Processing Sytems (NeurIPS 2018), Montreal, Canada.
Li et al. "An Efficient Task-based All-Reduce for Machine Learning Applications" Machine Learning on HPC Environments, Nov. 12-17, 2017.
Thier et al. "Fast and Flexible Instruction Selection with Constraints" Proceedings of the 27th International Conference on Compiler Construction, 2018.
International Search Report and Written Opinion, International Application No. PCT/EP2020/057322, International dated Mar. 17, 2020.

* cited by examiner

METHOD FOR FLEXIBLE, FAST ALL-REDUCE ON ARBITRARY TREE TOPOLOGY

BACKGROUND

One of the primary uses for the present invention relates to the field of deep learning, and more specifically, to executing an all-reduce algorithm on an arbitrary tree topology in deep learning and/or high-performance computing implementations.

Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Any or all of the data utilized and created in a deep-learning system may be transmitted across one or more networks, may subsequently be subject to any limitations of said one or more networks. In particular, with respect to large scale deep-learning systems in both local and cloud environments, any network communication may be subject to a bottleneck due to a large number of learners, the frequency of data exchange across the network, and the volume of the data being exchanged. Furthermore, communication across a multi-tiered or mutating (e.g., in cloud environments) network can be largely inefficient, as the weakest link or node in the network will largely dictate how the network will perform as a whole.

One approach to increasing efficiency in large scale deep-learning systems is to employ reduce operations. Reduce operations are a classical concept from functional programming that effectively reduce an initial set of numbers into a smaller set of numbers, often in parallel via functions that are both associative and commutative. Some existing programming functions enable reduce operations across multiple processes, with the result returned either to the root process in some cases or to all of the processes involved in other cases.

When training a deep learning system on multiple graphic processing units (GPUs) in parallel, choices must be made regarding how to distribute data batches or groups and operations to be read and executed across the available GPUs. Each GPU then runs forward propagation of the network on its own data, as well as error backpropagation to determine a gradient of loss with respect to any existing network parameters. The GPUs then communicate with one another to compute an average gradient, which communication may occur across various networks. This communication is susceptible to any network limitations each time communication occurs, which can lead to a severe slowdown of data transfer within a deep learning system.

SUMMARY

According to an embodiment, a method is provided for sending data across processors to combine the data on the processors includes receiving a set of data D (D1, D2, . . . , Dn) at a set of processors P (P1, P2, . . . , Pk), wherein data Di is received at processor Pi. The method includes assigning target portions of the set of data to processors of the set of processors, wherein the set of processors is configured in a tree topology including a root and one or more leaves, and wherein the target portions are assigned based on a number of child processors that are connected to a parent node. The method also includes sending iteratively apportioned combined data between child processors sharing the same parent node in each branch of the tree topology starting from the one or more leaves and increasing levels in the tree topology until reaching the root. The method further includes sending the combined data between child processors from one branch to child processors in at least one other branch.

In another form, a system for implementing the method for sending data across processors to combine the data on the processors is provided.

In another form, a computer program product for sending data across processors to combine the data on the processors is provided.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
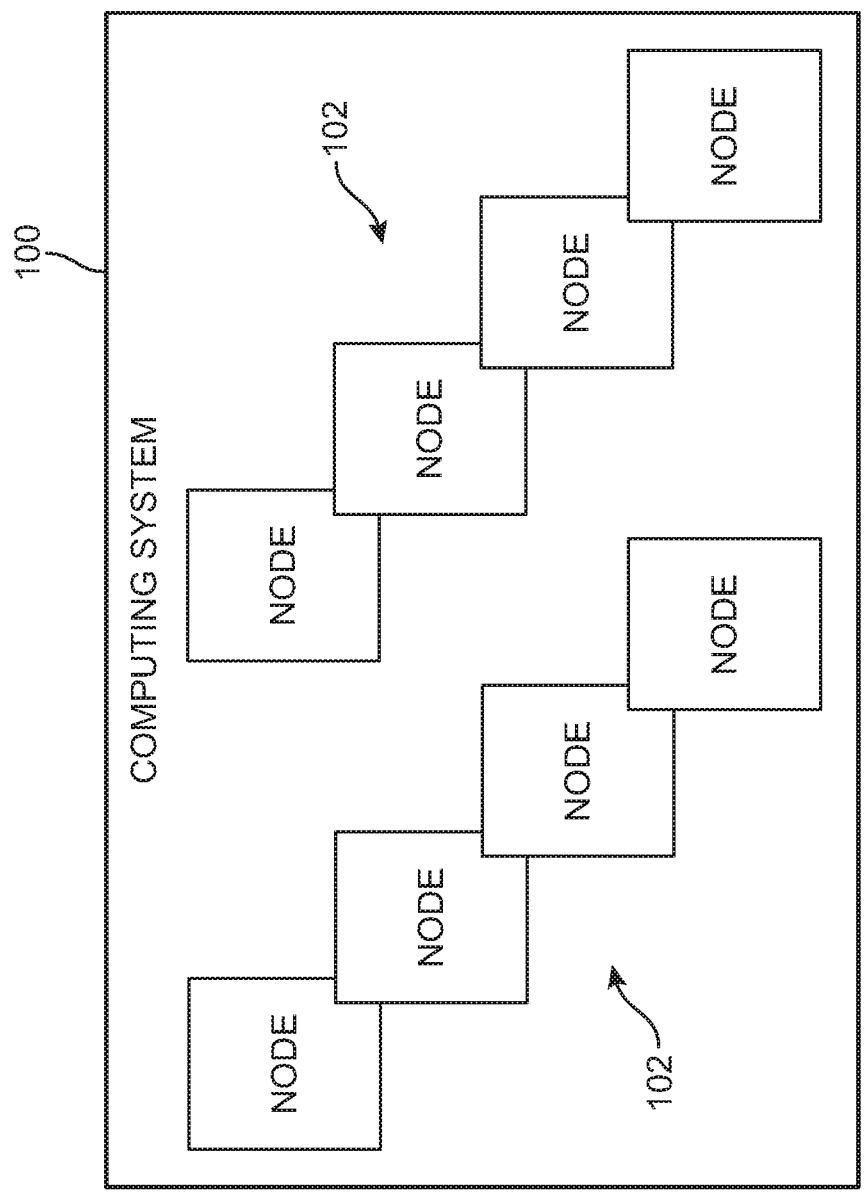
FIG. 1 is a block diagram of an example embodiment of a computing system configured to execute an all-reduce algorithm.

Aspects of the example embodiments described herein provide a method for performing an all-reduce operation on an arbitrary network topology, including both symmetric and asymmetric tree topologies. With reference now to FIG. 1, an example embodiment of a deep learning computing system 100 configured to execute an all-reduce algorithm for sending data across processors to combine the data on the processors is shown. In this embodiment, deep learning computing system 100 includes a set of processors or nodes 102. In at least one embodiment, at least one processor of the set of processors 102 is a graphic processing unit (GPU).

In some embodiments, the set of processors or nodes 102 of deep learning computing system 100 may be arranged in an arbitrary network topology. For example, the set of processors 102 may be configured in an asymmetrical tree topology including a root and one or more leaves. In embodiments having an asymmetrical tree topology, the root is the top processor or node in the tree. Each branch of the tree from the root may include a parent node that is connected to one or more child processors or nodes at lower levels or branches of the tree. A branch may also include one or more leaves, which are processors or nodes that are not connected to any child processors or nodes. In other embodiments, the set of processors 102 may be configured in a symmetric tree topology.

Figure 2:
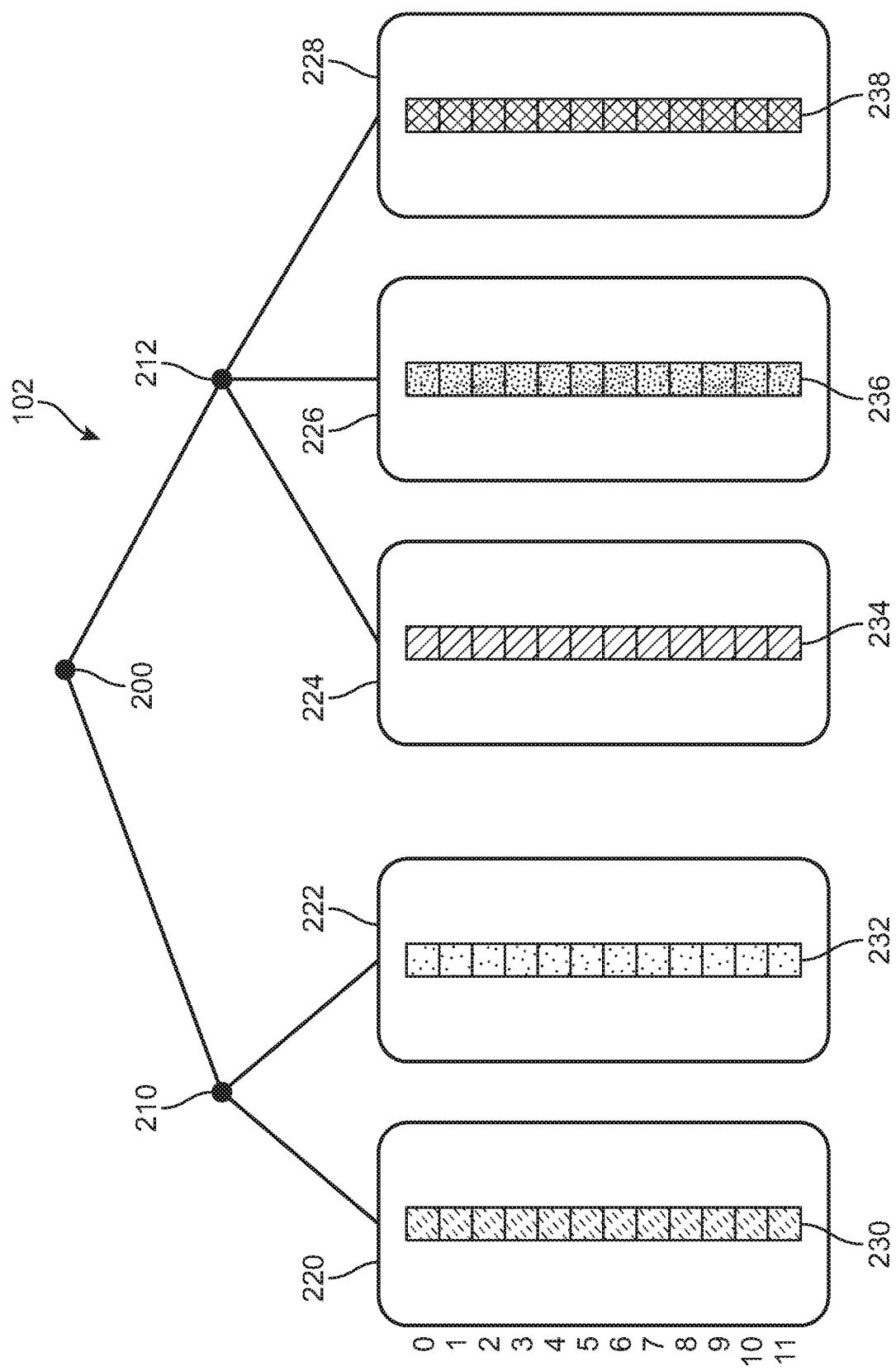
FIG. 2 is a representational view of an example embodiment of a computing system with a tree topology.

FIG. 2 illustrates an example embodiment of the set of processors 102 of deep learning computing system 100 arranged in a tree topology. As shown in FIG. 2, the tree topology of set of processors 102 includes a root processor or node 200 at the top level. Next, moving down levels to the next branch, set of processors 102 includes a first parent node 210 and a second parent node 212. In an example embodiment, first parent node 210 and second parent node 212 may be processors. In general, however, each parent node does not typically function as a processor but rather as a connection between children processors or nodes or as a connection between subtrees (other connecting parent nodes). During reduction operations, no active computation occurs in these intermediate branch nodes, all the computation is performed by child processors.

In this embodiment, first parent node 210 is connected to two child processors, including a first child processor 220 and a second child processor 222. Because first child processor 220 and second child processor 222 are not connected to any further children, first child processor 220 and second child processor 222 are leaves. In this embodiment, second parent node 212 is connected to three child processors, including a third child processor 224, a fourth child processor 226, and a fifth child processor 228. Because third child processor 224, fourth child processor 226, and fifth child processor 228 are not connected to any further children, third child processor 224, fourth child processor 226, and fifth child processor 228 are also leaves.

As shown in FIG. 2, the tree topology of the set of processors 102 of deep learning computing system 100 is asymmetric because first parent node 210 has two children, first child processor 220 and second child processor 222, while second parent node 212 has three children, third child processor 224, fourth child processor 226, and fifth child processor 228. The techniques described herein, however, apply to both asymmetric and symmetric tree topologies.

In some embodiments, a set of data D (D1, D2, ..., Dn) is received at a set of processors P (P1, P2, ..., Pk), wherein data Di is received at processor Pi. In this embodiment, the set of data includes first data 230, second data 232, third data 234, fourth data 236, and fifth data 238. As shown in FIG. 2, first data 230 is received at first child processor 220, second data 232 is received at second child processor 222, third data 234 is received at third child processor 224, fourth data 236 is received at fourth child processor 226, and fifth data 238 is received at fifth child processor 228. Additionally, as shown in this embodiment, each data of the set of data is associated with data items having twelve indices labeled from zero (0) to eleven (11).

In an example embodiment, FIG. 2 represents an initial state of set of processors 102 of deep learning computing system 100 upon receiving the set of data 230, 232, 234, 236, 238. The techniques of the example embodiments presented herein provide a method for executing an all-reduce algorithm for sending data (i.e., set of data 230, 232, 234, 236, 238) across processors (i.e., set of processors 102) to combine the data on the processors.

Figure 3:
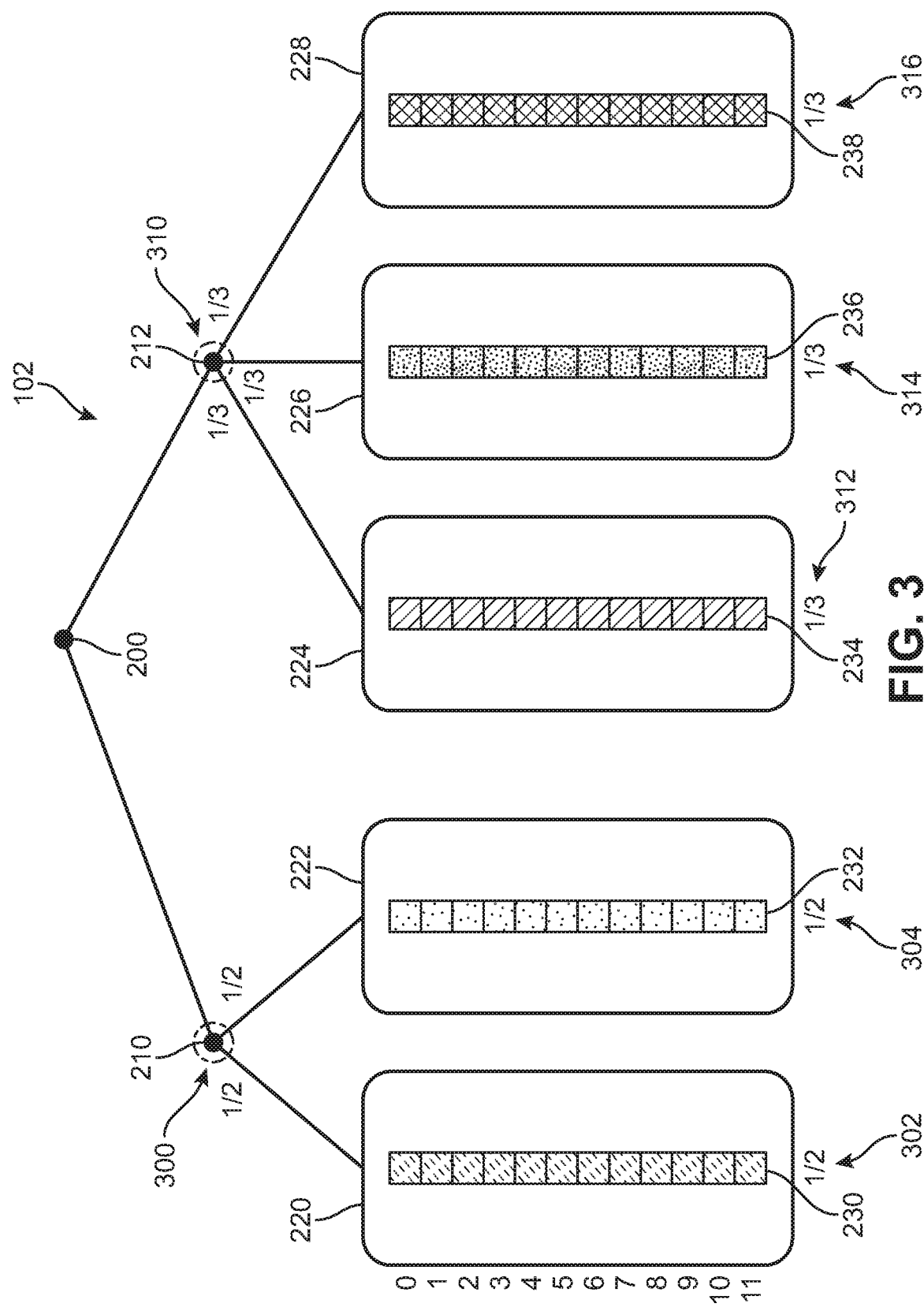
FIG. 3 is a representational view of a process of assigning target portions to nodes in a computing system.

Referring now to FIG. 3, a process of assigning target portions of the set of data to set of processors 102 in deep learning computing system 100 is shown. As shown in this embodiment, target portions of the set of data 230, 232, 234, 236, 238 are assigned to set of processors 102 at a first level of the tree. In an example embodiment, the target portions are assigned based on a number of child processors that are connected to a parent node.

For example, as shown in FIG. 3, first parent node 210 is connected to two child processors, first child processor 220 and second child processor 222. At branch 300, each child processor is assigned a target portion of the set of data based on the degree of first parent node 210 (i.e., 2 in this case). Each child processor connected to first parent node 210 is assigned a target portion corresponding to ½ of the data. As shown in this embodiment, a first target portion 302 (e.g., ½) is assigned to first child processor 220 and a second target portion 304 (e.g., ½) is assigned to second child processor 222. The sum of target portions assigned to all child processors connected to first parent node 210 at branch 300 adds up to one (e.g., ½+½=1).

A similar process is used to assign target portions at branch 310. At branch 310, however, second parent node 212 is connected to three child processors, third child processor 224, fourth child processor 226, and fifth child processor 228. Accordingly, each child processor is assigned a target portion of the set of data based on the degree of second parent node 212 (i.e., 3 in this case). Each child processor connected to second parent node 212 is assigned a target portion corresponding to ⅓ of the data. As shown in this embodiment, a third target portion 312 (e.g., ⅓) is assigned to third child processor 224, a fourth target portion 314 (e.g., ⅓) is assigned to fourth child processor 226, and a fifth target portion 316 (e.g., ⅓) is assigned to fifth child processor 228. The sum of target portions assigned to all child processors connected to second parent node 212 at branch 310 adds up to one (e.g., ⅓+⅓+⅓=1).

Figure 4:
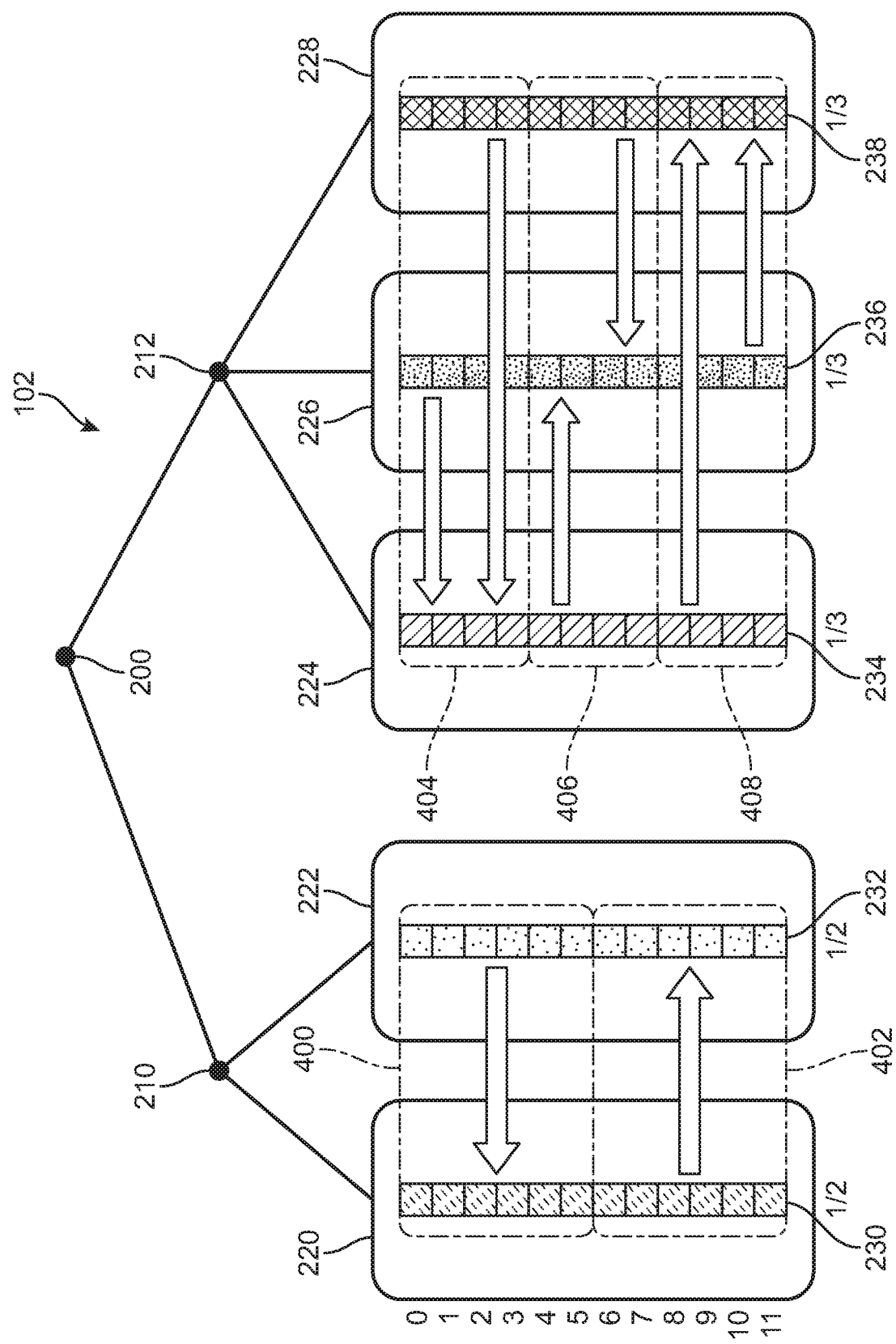
FIG. 4 is a representational view of a process of executing a reduce-scatter algorithm between nodes in a computing system.

FIG. 4 illustrates a process of executing a reduce-scatter algorithm between set of processors 102 in deep learning computing system 100 to send the apportioned data between child processors. In an example embodiment, the reduce-scatter operation is executed between the leaves on each branch of the tree. The reduce-scatter algorithm causes the processors to exchange data such that each processor ends up with a piece of the final result. During the reduce-scatter operation, each processor combines the data item it receives from another processor with a data item existing in its own range of data items corresponding to the assigned chunk or partition (i.e., the target portion). This operation is performed iteratively until each processor contains at least one data element that is representative of an aggregation of the corresponding data items from each partition (i.e., target portion). After the reduce-scatter operation is complete, each processor has an array of values which include contributions from each processor on the branch.

In this embodiment, a ring algorithm is executed between child processors sharing the same parent node in each branch of the tree topology. For example, first child processor 220 and second child processor 222, which are both connected to first parent node 210, exchange their target portions (e.g., ½) of first data 230 and second data 232 between themselves. As shown in FIG. 4, first child processor 220 receives its target portion of second data 232, corresponding to data items 0 through 5 (i.e., six data items which are ½ of the twelve data items contained in first data 230 and second data 232), from second child processor 222 in a first operation 400. Similarly, second child processor 222 receives its target portion of first data 230, corresponding to data items 6 through 11 (i.e., six data items which are ½ of the twelve data items contained in first data 230 and second data 232), from first child processor 220 in a second operation 402.

A similar reduce-scatter operation is performed on the other branch of the tree descending from second parent node 212. For example, third child processor 224, fourth child processor 226, and fifth child processor 228, which are all connected to second parent node 212, exchange their target portions (e.g., ⅓) of third data 234, fourth data 236, and fifth data 238 amongst themselves. As shown in FIG. 4, third child processor 224 receives its target portion of fourth data 236, corresponding to data items 0 and 1, from fourth child processor 226 and fifth data 238, corresponding to data items 2 and 3, from fifth child processor 228 (i.e., four data items which are ⅓ of the twelve data items contained in third data 234, fourth data 236, and fifth data 238) in a third operation 404. Similarly, fourth child processor 226 receives its target portion of third data 234, corresponding to data items 4 and 5, from third child processor 224 and fifth data 238, corresponding to data items 6 and 7, from fifth child processor 228 (i.e., four data items which are ⅓ of the twelve data items contained in third data 234, fourth data 236, and fifth data 238) in a fourth operation 406.

Additionally, fifth child processor 228 receives its target portion of third data 234, corresponding to data items 8 and 9, from third child processor 224 and fourth data 236, corresponding to data items 10 and 11, from fourth child processor 226 (i.e., four data items which are ⅓ of the twelve data items contained in third data 234, fourth data 236, and fifth data 238) in a fifth operation 408.

In this manner, the reduce-scatter algorithm is used to send the iteratively apportioned combined data between child processors sharing the same parent node in each branch of the tree topology starting from the one or more leaves and increasing levels in the tree topology until reaching root 200.

Figure 5:
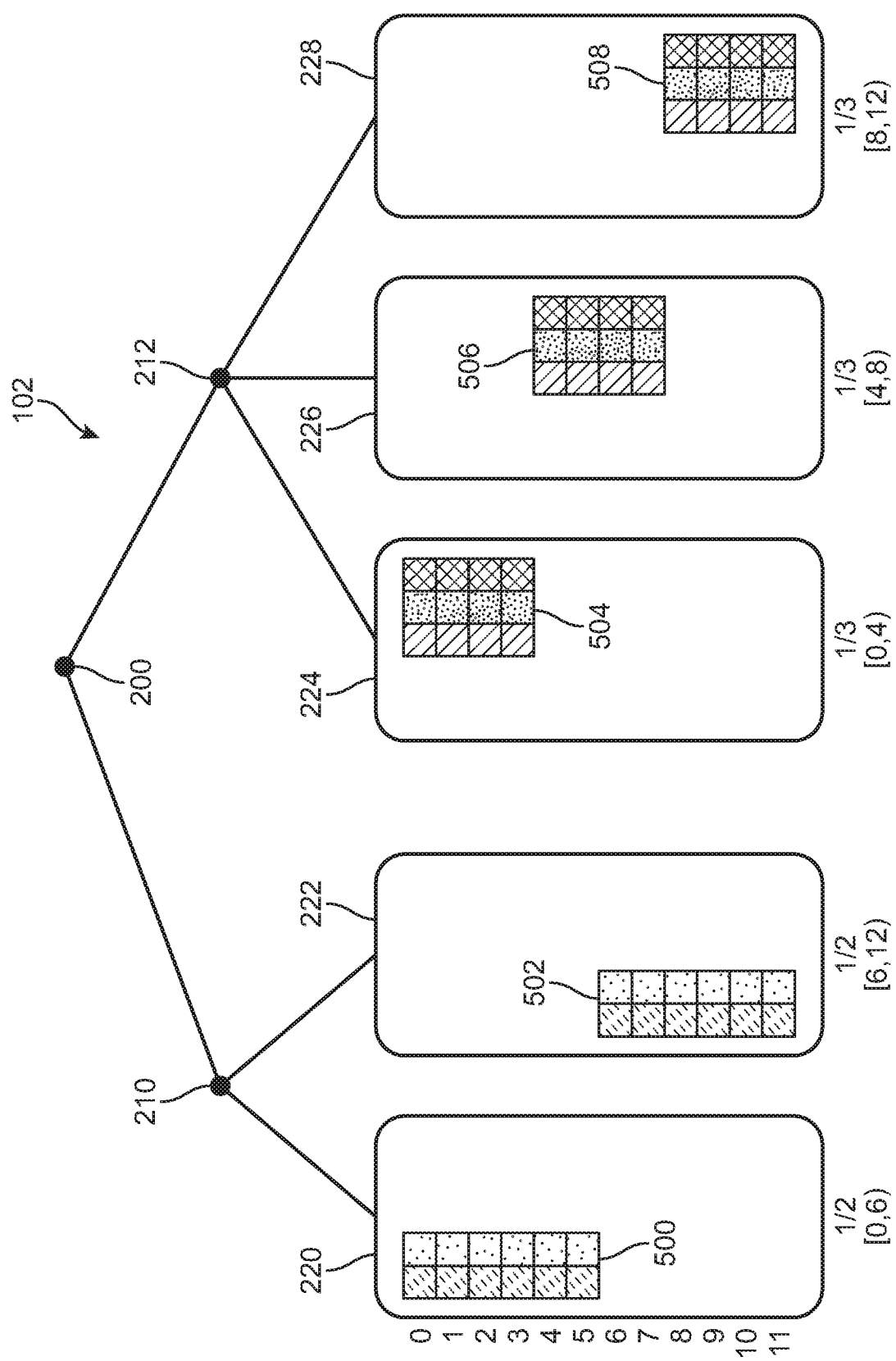
FIG. 5 is a representational view of nodes in a computing system after a reduce-scatter operation.

Referring now to FIG. 5, set of processors 102 in deep learning computing system 100 are shown after the reduce-scatter operation performed as shown in FIG. 4. After the execution of the reduce-scatter operations between the child processors sharing the same parent node in each branch of the tree, each processor includes combined data associated with its portion of the set of data. For example, as shown in FIG. 5, first child processor 220 includes first combined data 500 corresponding to the combined data items in a range from 0 through 5 (i.e., [0, 6)), second child processor 222 includes second combined data 502 corresponding to the combined data items in a range from 6 through 11 (i.e., [6, 12)). Similarly, third child processor 224 includes third combined data 504 corresponding to the combined data items in a range from 0 through 3 (i.e., [0, 4)), fourth child processor 226 includes fourth combined data 506 corresponding to the combined data items in a range from 4 through 7 (i.e., [4, 8)), and fifth child processor 228 includes fifth combined data 508 corresponding to the combined data items in a range from 8 through 11 (i.e., [8, 12)).

Figure 6:
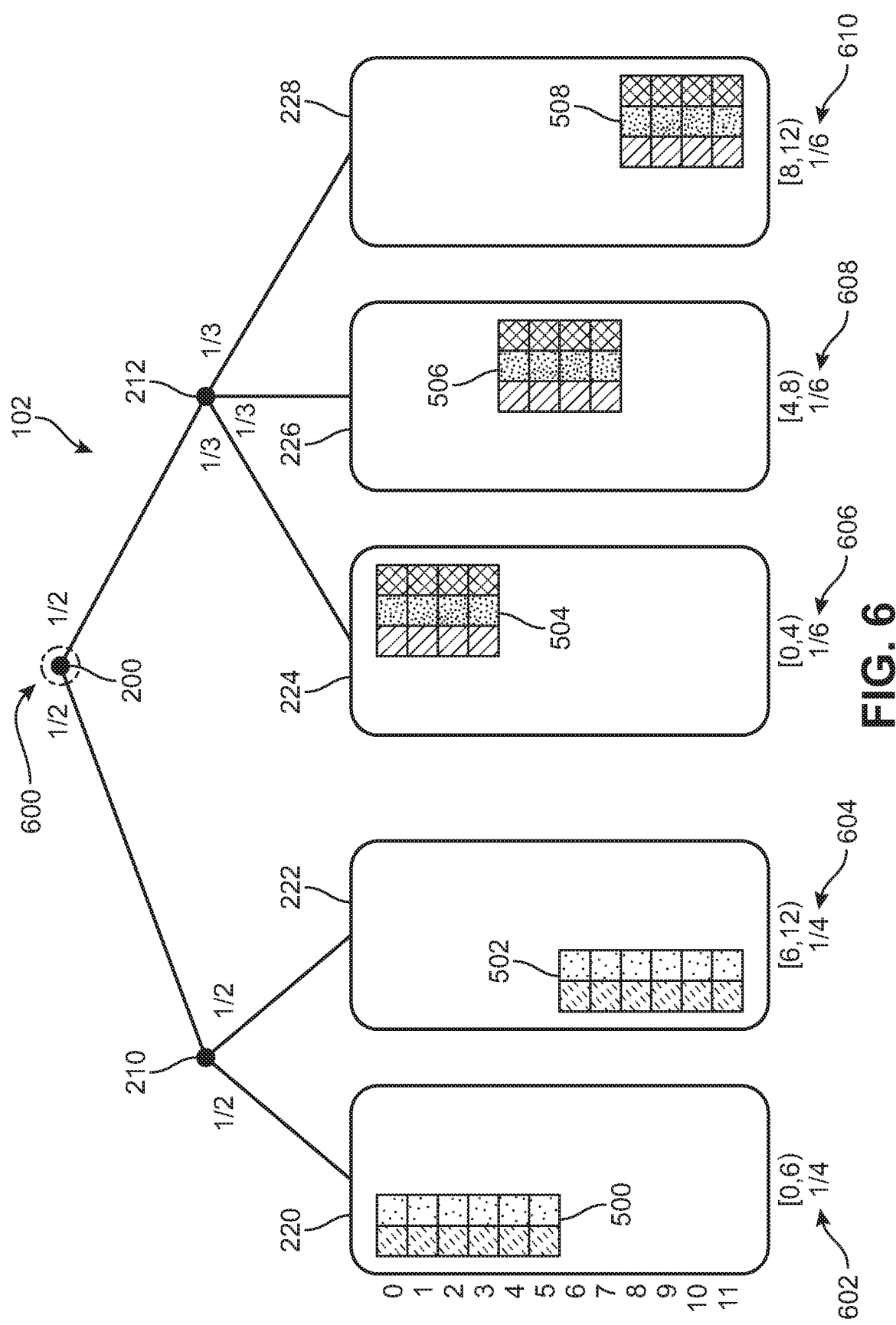
FIG. 6 is representational view of a process of assigning target portions to nodes in a computing system.

FIG. 6 illustrates a process of assigning target portions of the combined data to set of processors 102 in deep learning computing system 100 for the next level on the branch of the tree. In this embodiment, the next level is root 200. Root 200 is connected to two parent nodes, first parent node 210 and second parent node 212. At branch 600, each parent node connected to root 200 is assigned a target portion based on the degree of root 200 (i.e., 2 in this case). Descending to the next level in the tree, each child processor connected to first parent node 210 and second parent node 212 is assigned a target portion corresponding to its portion of the parent node's ½ of the data.

As shown in this embodiment, a first target portion 602 (e.g., ¼) is assigned to first child processor 220 and a second target portion 604 (e.g., ¼) is assigned to second child processor 222. The sum of target portions assigned to all child processors connected to first parent node 210 adds up to the ½ portion assigned at branch 600 to first parent node 210 (e.g., ¼+¼=½). A similar process is used to assign target portions to the child processors of second parent node 212. As shown in this embodiment, a third target portion 606 (e.g., ⅙) is assigned to third child processor 224, a fourth target portion 608 (e.g., ⅙) is assigned to fourth child processor 226, and a fifth target portion 610 (e.g., ⅙) is assigned to fifth child processor 228. The sum of target portions assigned to all child processors connected to second parent node 212 adds up to the ½ portion assigned at branch 600 to second parent node 212 (e.g., ⅙+⅙+⅙=½).

Figure 7:
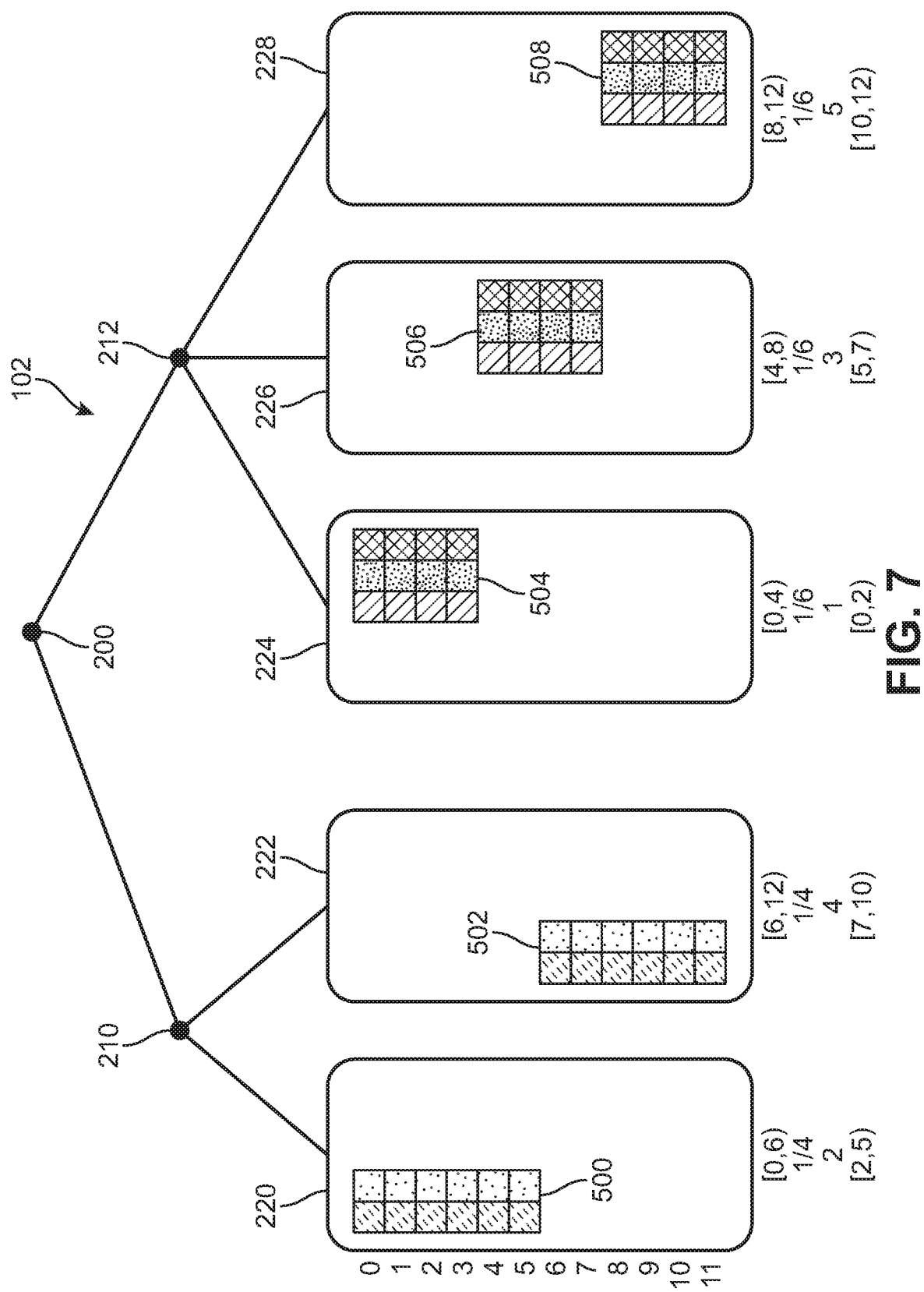
FIG. 7 is a representational view of a process of assigning target items to nodes in a computing system.

Referring now to FIG. 7, a process of assigning target data items to each processor in set of processors 102 in deep learning computing system 100 is shown. In this embodiment, each child processor is assigned its target data items of the combined data based on the target portions determined as described above in reference to FIG. 6. In an example embodiment, before assigning the target portions, the child processors in set of processors 102 are ordered from last to first based on the last data item index value for each processor's combined data, where a tie is decided by the first data item index. In this embodiment, fifth child processor 228 is assigned last position (e.g., fifth of five) because fifth combined data 508 has last data item index 12 and first data item index 8. Second child processor 222 is assigned fourth position because second combined data 502 has last data item index 12 and first data item index 6. In this case, fifth child processor 228 and second child processor 222 have the same last data item index (i.e., 12), but because fifth child processor has a greater first data item index (i.e., 8 compared to 6), fifth child processor 228 is assigned fifth place before second child processor 222.

Fourth child processor 226 is assigned third position because third combined data 506 has the next greatest last data item index (i.e., 8), followed by first child processor 220 assigned to second position based on last data item index 6 of first combined data 500 and third child processor 224 assigned to first position based on last data item index 4 of third combined data 504. At this point, the order of assigning the target portions to set of processors 102 from first to last is as follows: third child processor 224, first child processor 220, fourth child processor 226, second child processor 222, and fifth child processor 228.

Each target portion of the combined data is then assigned to each child processor in set of processors 102 in this determined order. As shown in FIG. 7, third child processor 224 is assigned its target portion (i.e., ⅙) of third combined data 504 first, corresponding to the combined data items 0 and 1 (i.e., [0,2)). Next, first child processor 220 is assigned its target portion (i.e., ¼) of first combined data 500, corresponding to the combined data items 2 through 4 (i.e., [2, 5)). Fourth child processor 226 is the next processor to be assigned its target portion (i.e., ⅙) of fourth combined data 506, corresponding to combined data items 5 and 6 (i.e., [5,7)). Second child processor 222 is assigned its target portion (i.e., ¼) of second combined data 502, corresponding to the combined data items 7 through 9 (i.e., [7, 10)), and, lastly, fifth child processor 226 is assigned its target portion (i.e., ⅙) of fifth combined data 508, corresponding to combined data items 10 and 11 (i.e., [10,12)).

Figure 8:
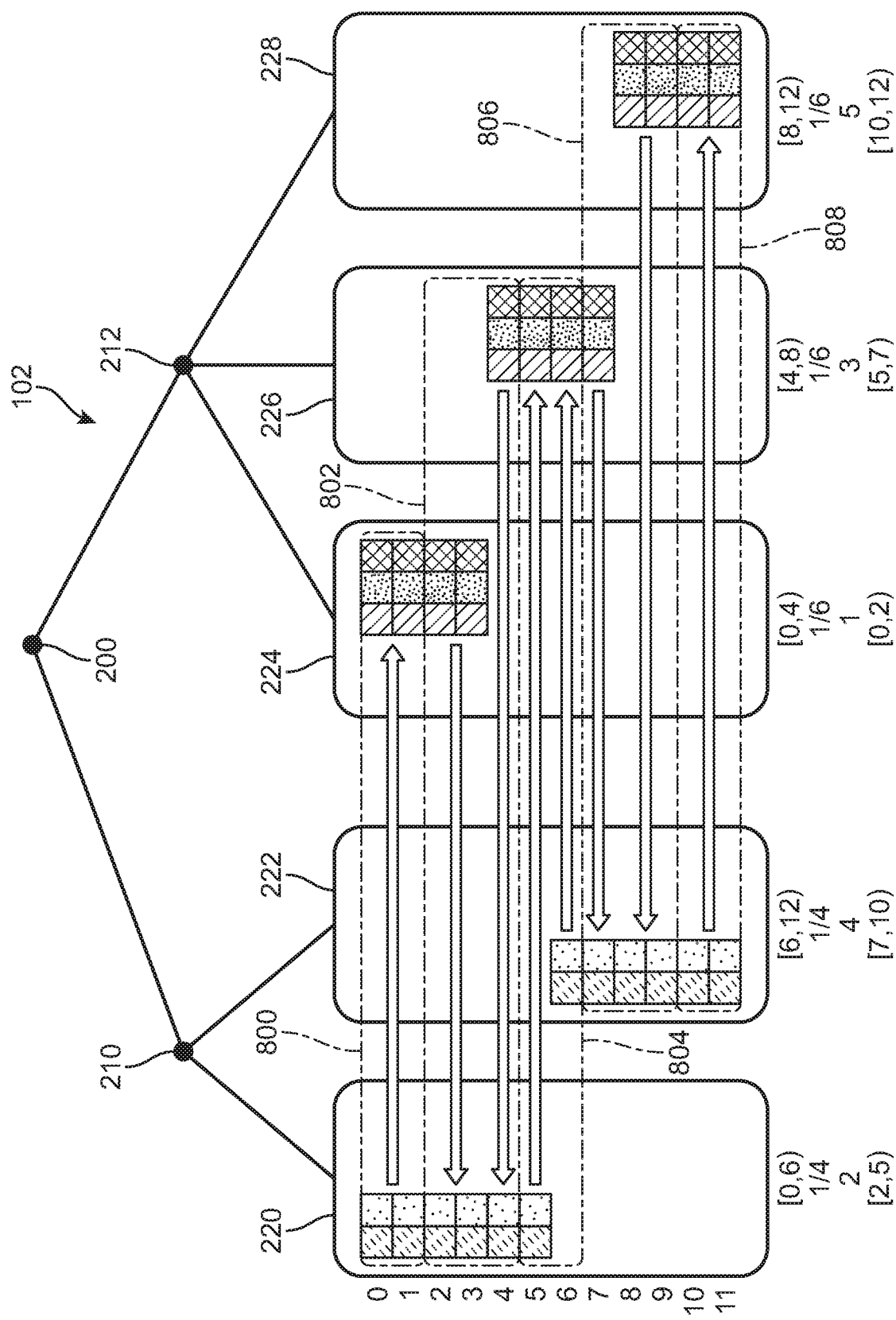
FIG. 8 is a representational view of a process of executing another reduce-scatter algorithm between nodes in a computing system.

FIG. 8 illustrates a process of executing another reduce-scatter algorithm between set of processors 102 in deep learning computing system 100. In an example embodiment, a hierarchical algorithm is executed where the assigned portion is reduced based on the degree of the current branch of the tree topology. In this embodiment, the reduce-scatter algorithm is executed between child processors from one branch (i.e., children of first parent node 210) to child processors in the other branch (i.e., children of second parent node 212). During this reduce-scatter operation, data items within the same range are exchanged between the child processors in each branch.

In this embodiment, a reduce-scatter algorithm is executed between child processors having different parent nodes in the tree. For example, first child processor 220 and second child processor 222, which are both connected to first parent node 210, exchange their target portions with the target portions assigned to third child processor 224, fourth child processor 226, and fifth child processor 228, which are all connected to second parent node 212. Thus, in this embodiment, there is no intra-branch exchange between child processors having the same parent node.

As shown in FIG. 8, third child processor 224 receives its target portion, corresponding to data items 0 and 1 (i.e., two data items which are ⅙ of the twelve data items), from first child processor 220 in a first operation 800. First child processor 220 receives its target portion, corresponding to data items 2 through 4 (i.e., three data items which are ¼ of the twelve data items), from third child processor 224 (which sends data items 2 and 3) and fourth child processor 226 (which sends data item 4) in a second operation 802. Fourth child processor 226 receives its target portion, corresponding to data items 5 and 6 (i.e., two data items which are ⅙ of the twelve data items), from first child processor 220 (which sends data item 5) and second child processor 222 (which sends data item 6) in a third operation 804. Similarly, second child processor 222 receives its target portion, corresponding to data items 7 through 9 (i.e., three data items which are ¼ of the twelve data items), from fourth child processor 226 (which sends data item 7) and fifth child processor 228 (which sends data items 8 and 9) in a fourth operation 806.

Lastly, fifth child processor 228 receives its target portion, corresponding to data items 10 and 11 (i.e., two data items which are ⅙ of the twelve data items), from second child processor 222 in a fifth operation 808. Upon completion of fifth operation 808, the reduce-scatter algorithm has finished combing the data across the branches. That is six data items of the combined data is sent by the child processors of each branch to the child processors of the other branch for a total of twelve data items. In this manner, the reduce-scatter algorithm is used to send the combined data between child processors in each branch of the tree topology.

Figure 9:
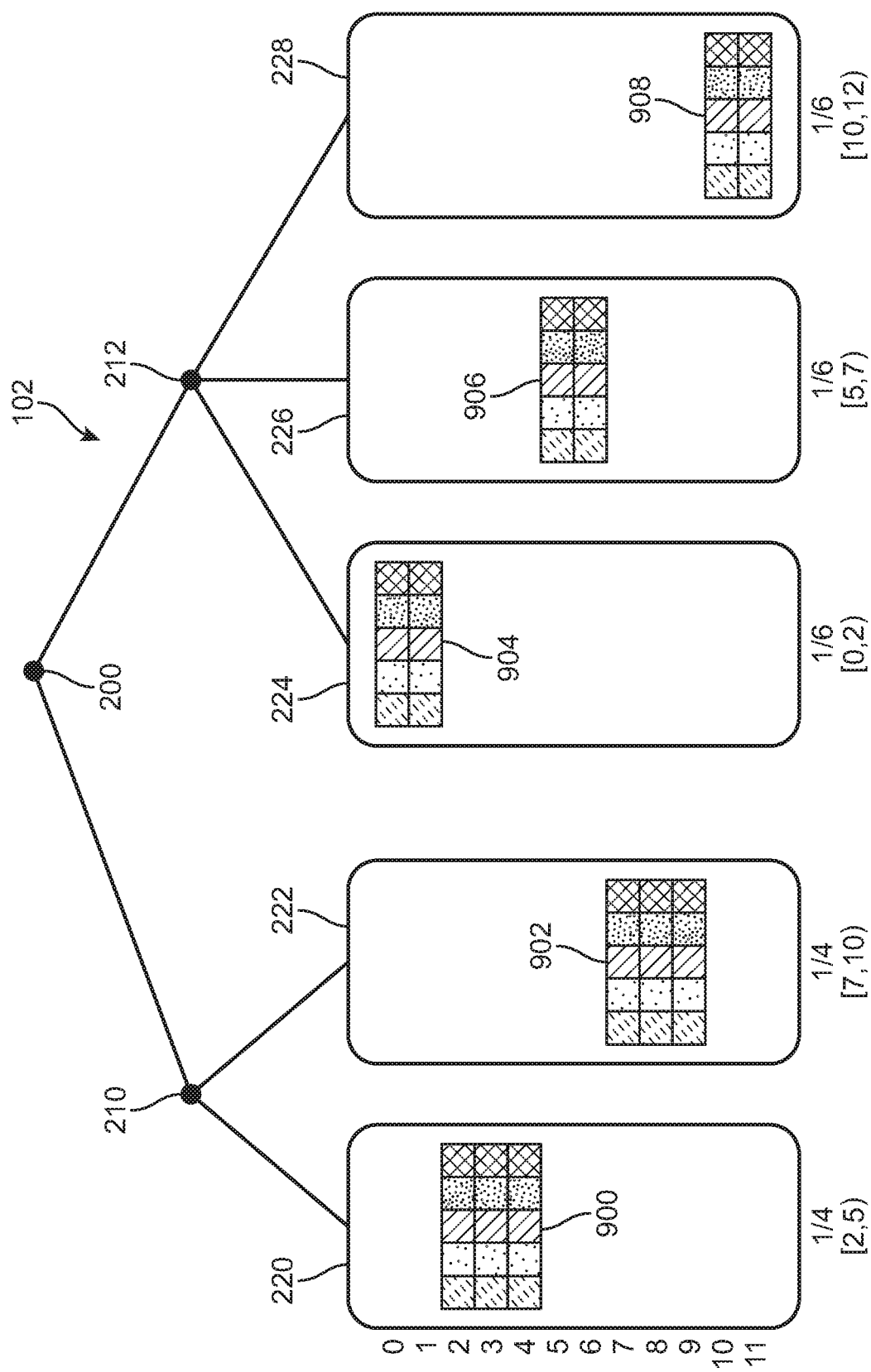
FIG. 9 is a representational view of nodes in a computing system after another reduce-scatter operation.

FIG. 9 illustrates set of processors 102 in deep learning computing system 100 after the reduce-scatter operations executed as described above in reference to FIG. 8. In this embodiment, the set of data 230, 232, 234, 236, 238 has been combined across all of the processors in the set of processors 102. Each processor now includes its assigned portion of the combined data. For example, first child processor 220 includes first combined data 900, which includes data items corresponding to a range from two through 4 (i.e., [2,5)) from each processor of set of processors 102. Second child processor 222 includes second combined data 902, which includes data items corresponding to a range from seven through 9 (i.e., [7,10)) from each processor of set of processors 102. Third child processor 224 includes third combined data 904, which includes data items corresponding to a range from zero to one (i.e., [0,2)) from each processor of set of processors 102. Fourth child processor 226 includes fourth combined data 906, which includes data items corresponding to a range from five to six (i.e., [5,7)) from each processor of set of processors 102. Fifth child processor 228 includes fifth combined data 908, which includes data items corresponding to a range from ten to eleven (i.e., [10,12)).

In order to combine the complete set of data from each processor of set of processors 102 on each processor, an all-gather algorithm is executed. Using the all-gather algorithm, the combined data is gathered from each processor in set of processors 102 in an order that is opposite from an order of sending the combined data, as described above in reference to FIG. 8. This technique allows each portion of the combined data to be combined together so that each processor in set of processors 102 in deep learning computing system 100 includes the complete set of combined data.

Figure 10:
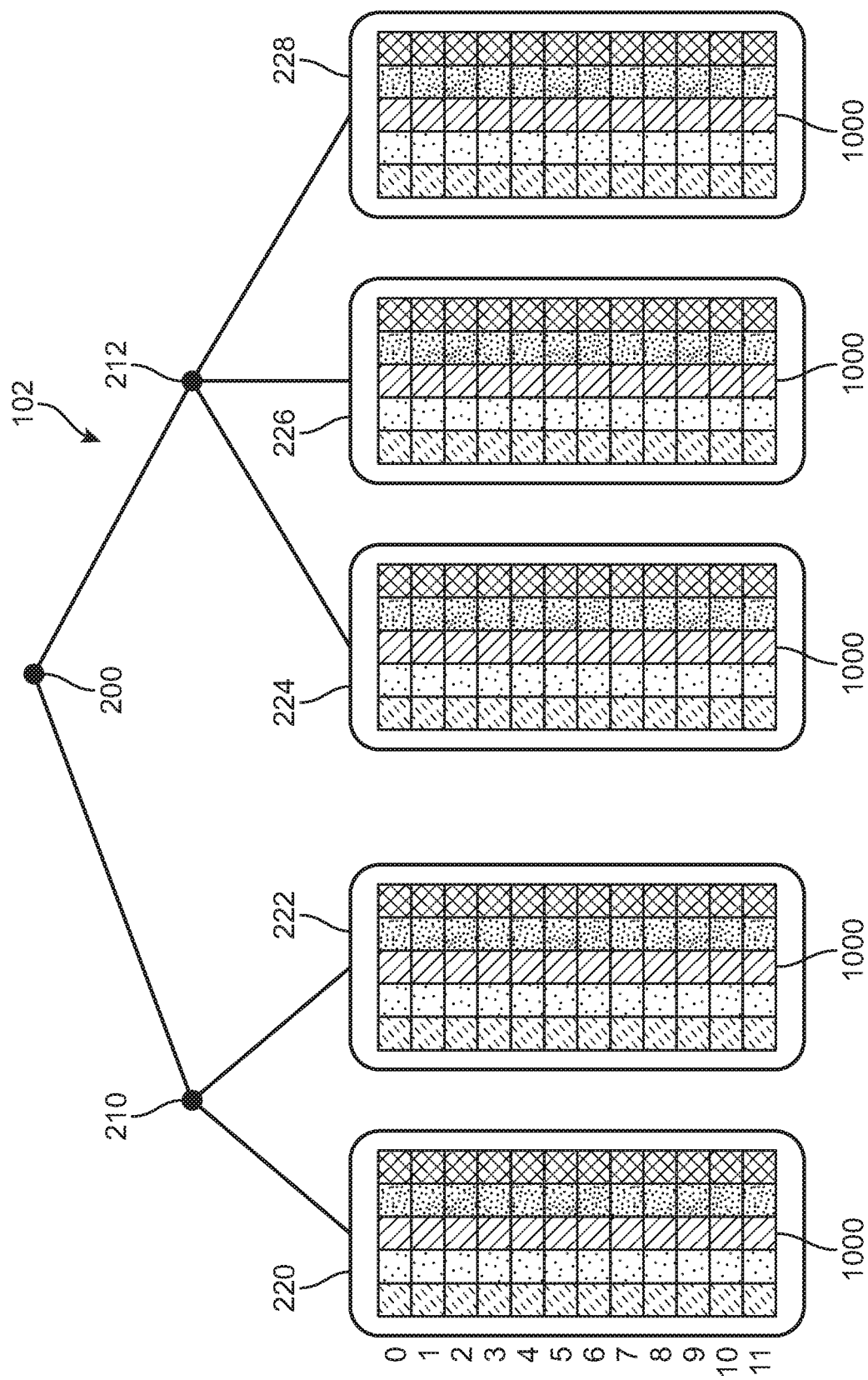
FIG. 10 is a representational view of nodes in a computing system after a gather operation.

Referring now to FIG. 10, set of processors 102 in deep learning computing system 100 are shown after execution of the all-gather algorithm. As shown in this embodiment, a complete set of combined data 1000 that includes the set of data 230, 232, 234, 236, 238 that was previously individually received by each processor of set of processors 102 is now included at each processor. That is, by applying the techniques described herein, complete set of combined data 1000 is included at first child processor 220, second child processor 222, third child processor 224, fourth child processor 226, and fifth child processor 228.

Figure 11:
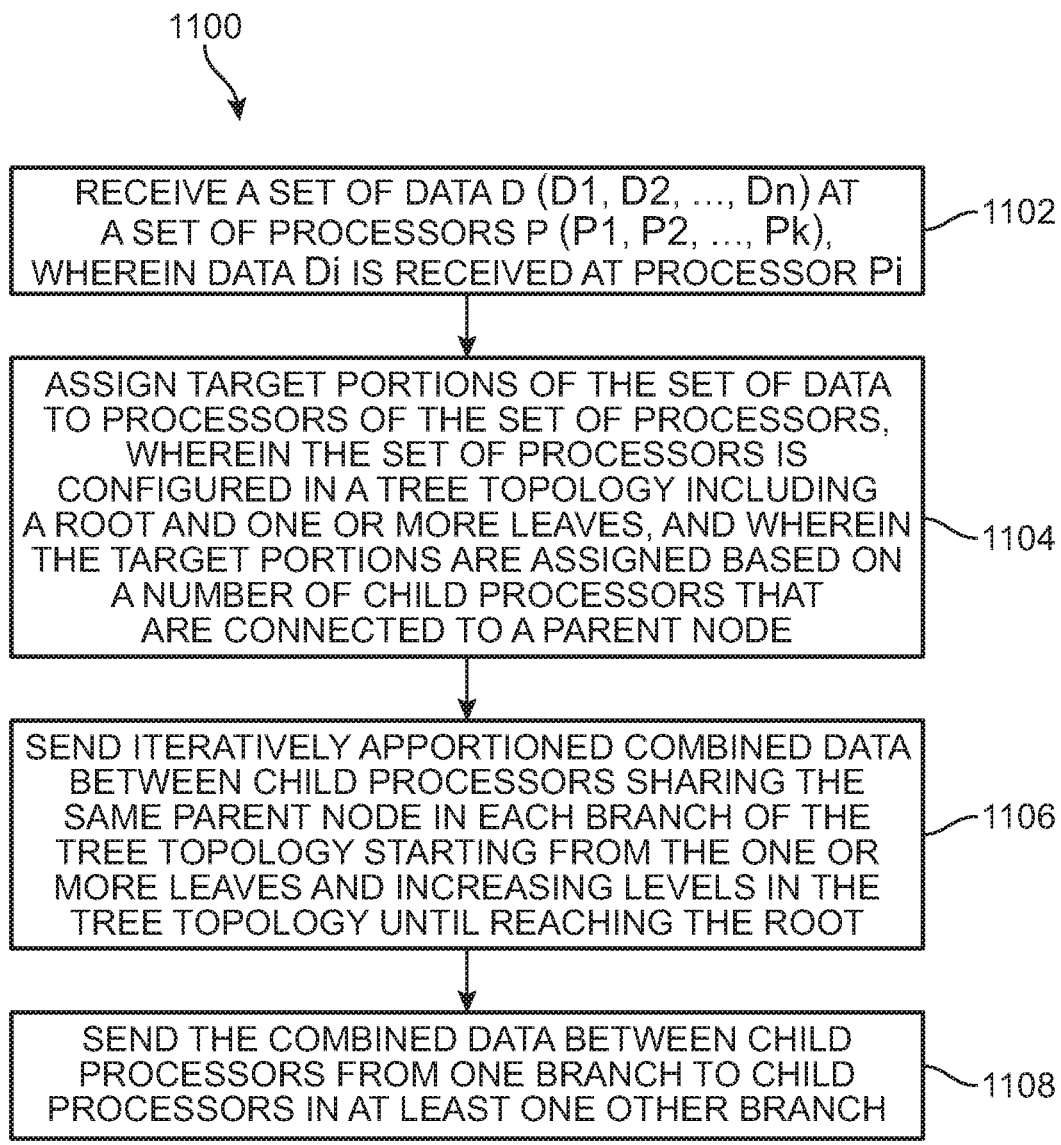
FIG. 11 is a flowchart of an example embodiment of a method for performing an all-reduce algorithm on nodes of a computing system.

FIG. 11 is a flowchart of an example embodiment of a method 1100 for performing an all-reduce algorithm on nodes of deep learning computing system 100. In an example embodiment, method 1100 may be executed by set of processors 102 of deep learning computing system 100 to combine a set of data across all of the processors. For example, at least one processor of set of processors 102 may include a leader node or coordinator node that implement or coordinates the instructions between the processors of set of processors 102.

In an example embodiment, method 1100 may begin at an operation 1102. At operation 1102, a set of data D (D1, D2, ..., Dn) is received at a set of processors P (P1, P2, ..., Pk), wherein data Di is received at processor Pi. For example, as shown in FIG. 2, set of data 230, 232, 234, 236, 238 is received at set of processors 102. Next, method 1100 proceeds to an operation 1104. At operation 1104, target portions of the set of data are assigned to processors of the set of processors, wherein the set of processors is configured in a tree topology including a root and one or more leaves, and wherein the target portions are assigned based on a number of child processors that are connected to a parent node. For example, as described in reference to FIG. 3 above, target portions 302, 304, 306, 308 are assigned to child processors 220, 222, 224, 226, 228.

Upon assigning the target portions at operation 1104, method 1100 includes an operation 1106 where iteratively apportioned combined data is sent between child processors sharing the same parent node in each branch of the tree topology starting from the one or more leaves and increasing levels in the tree topology until reaching the root. For example, as shown in FIG. 4, a reduce-scatter algorithm is executed so that first child processor 220 and second child processor 222 exchange their target portions of data and third child processor 224, fourth child processor 226, and fifth child processor 228 exchange their target portions of data.

In some embodiments, upon completion of the iterations of sending the apportioned combined data performed at operation 1106, method 1100 may further include assigning target portions of the combined data in an order based on the last data index of the apportioned combined data associated with each processor of set of processors 102, for example, as shown in FIGS. 6 and 7.

Next, method 1100 further includes an operation 1108, where the combined data is sent between child processors from one branch to child processors in at least one other branch. For example, as described with reference to the operations of the reduce-scatter operations shown in FIG. 8 above.

Additionally, in some embodiments, method 1100 may further include executing one or more gather operations as part of an all-gather algorithm in an order that is opposite from an order of sending the combined data. This technique allows each portion of the combined data to be combined together so that each processor in the set of processors includes the complete set of combined data, for example, as shown in FIG. 10 above.

While the example embodiments described herein have been discussed in reference to a deep learning computing system (e.g., deep learning computing system 100), the techniques described herein may be used by processors of other systems where large sets of data are to be combined across sets of processors.

Figure 12:
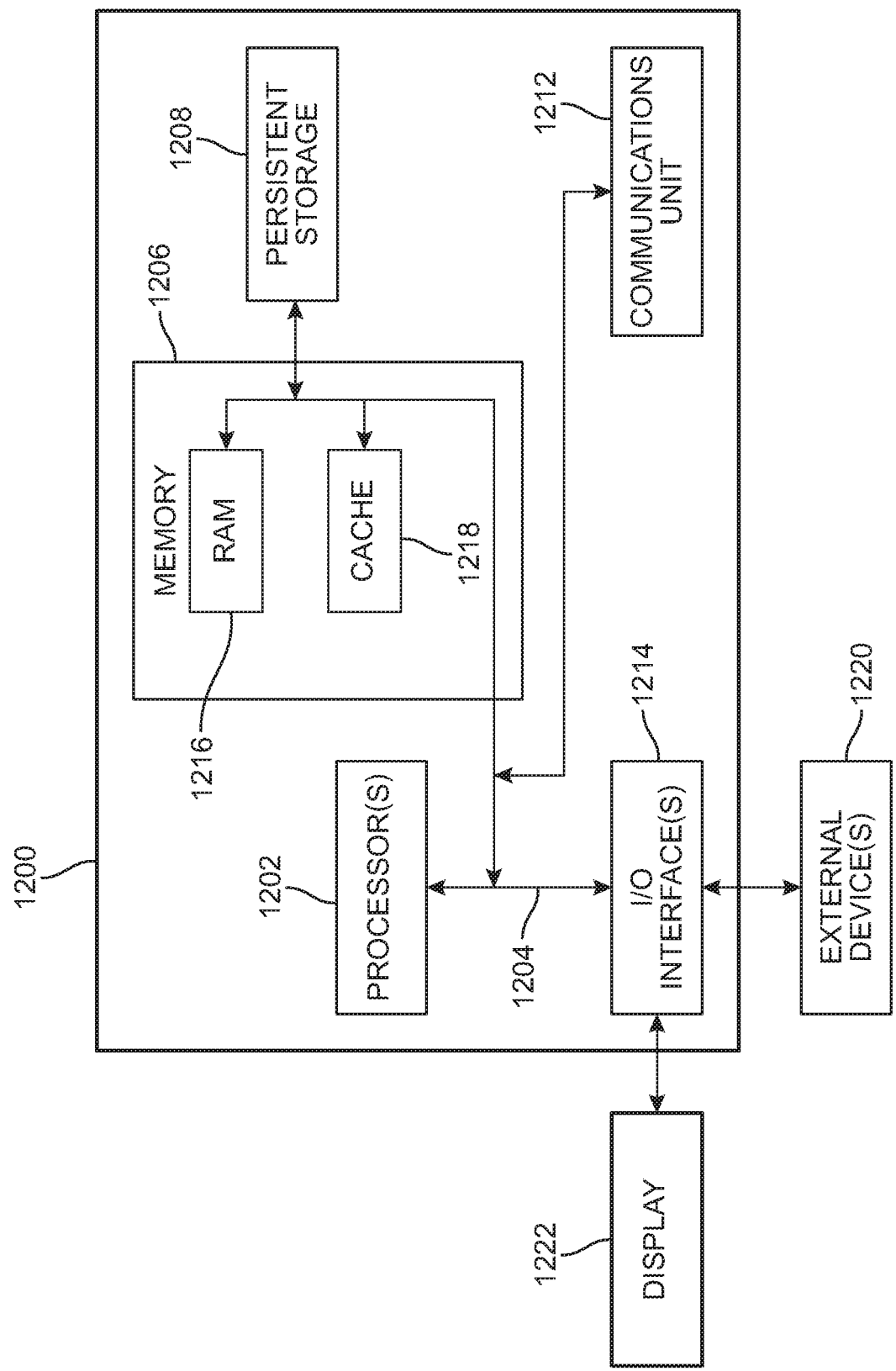
FIG. 12 is a block diagram of an example embodiment of a node of a computing system.

FIG. 12 illustrates a block diagram of components of a representative node 1200 including a processor 1202 according to an example embodiment. In one embodiment, processor 1202 may include a graphic processing unit (GPU). It should be appreciated that FIG. 12 provides only an illustration of one implementation and does not imply any limitations with regard to the environments in which different embodiments may be implemented. Many modifications to the depicted environment may be made.

As shown in FIG. 12, node 1200 includes a communications fabric 1204, which provides communications between processor(s) 1202, memory 1206, persistent storage 1208, a communications unit 1212, and input/output (I/O) interface(s) 1214. Communications fabric 1204 can be implemented with any architecture designed for passing data and/or control information between processors (such as microprocessors, communications and network processors, etc.), system memory, peripheral devices, and any other hardware components within a system. For example, communications fabric 1204 may be implemented with one or more buses.

Memory 1206 and persistent storage 1208 are computer-readable storage media. In this embodiment, memory 1206 includes a random access memory (RAM) 1216 and a cache memory 1218. In general, memory 1206 can include any suitable volatile or non-volatile computer-readable storage media.

One or more programs may be stored in persistent storage 1208 for access and/or execution by one or more of the respective processors 1202 via one or more memories of memory 1206. In this embodiment, persistent storage 1208 includes a magnetic hard disk drive. Alternatively, or in addition to a magnetic hard disk drive, persistent storage 1208 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1208 may also be removable. For example, a removable hard drive may be used for persistent storage 1208. Other examples include optical and magnetic disks, thumb drives, and smart cards that are inserted into a drive for transfer onto another computer-readable storage medium that is also part of persistent storage 1208.

Communications unit 1212, in these examples, provides for communications with other processors, data processing systems, or devices (e.g., between processors of set of processors 102, described above). In an example embodiment, communications unit 1212 may include one or more network interface cards. Communications unit 1212 may provide communications through the use of either or both physical and wireless communications links.

I/O interface(s) 1214 allows for input and output of data with other devices that may be connected to node 1200. For example, I/O interface 1214 may provide a connection to external devices 1220, such as a keyboard, keypad, a touch screen, and/or some other suitable input device. External devices 1220 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1208 via I/O interface(s) 1214. I/O interface(s) 1214 may also connect to a display 1222. Display 1222 provides a mechanism to display data to a user (e.g., a user of deep learning computing system 100) and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-12 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sending data across processors to combine the data on the processors, the method comprising:
    receiving a set of data at a set of processors in a deep learning system, wherein the set of processors are configured in a tree topology including a root, parent nodes of respective branches, and child processors connecting to respective ones of the parent nodes;
    assigning target portions of the set of data to respective ones of the child processors;
    executing first reduce-scatter operations to cause child processors sharing a same parent node to exchange data items of the target portions, such that one child processor sharing the same parent node combines its own data items with date items received from one or more other child processors sharing the same parent node;
    executing second reduce-scatter operations to cause data item exchanges between child processors connecting to different parent nodes, such that the sets of data are combined across all of the child processors and each of the child processors in all the respective branches includes combined data; and
    using an all-gather algorithm for each of the child processors to gather the combined data of other child processors in all the respective branches, such that all the child processors include a complete set of the combined data for deep learning.

2. The method of claim 1, wherein, in executing the first reduce-scatter operations, exchanging the data items of the target portions between the child processors uses a ring algorithm.

3. The method of claim 1, wherein, in executing the second reduce-scatter operations, exchanging the data items of the target portions between the child processors uses a hierarchical algorithm.

4. The method of claim 1, wherein, at a level of the parent nodes, distributing the target portions of the set of data to the child processors is based on degrees of the parent nodes; wherein, at a level of the root, distributing the target portions of the set of data to the child processors is based on degrees of the root.

5. The method of claim 1, further comprising:
    assigning ranges of data item indices for the respective ones of the child processors; and
    wherein, in executing the second reduce-scatter operations, a first child processor connecting to a first parent node receives data items, from a second child processor connecting to a second parent node, date items that are within a range of the data item indices of the first child processor.

6. The method of claim 1, wherein at least one processor of the set of processors is a graphic processing unit (GPU).

7. A computer program product for sending data across processors to combine the data on the processors, the computer program product comprising a computer readable storage medium having program instructions embodied therewith, the program instructions executable by processors of a set of processors to cause the processors to perform a method comprising:
    receiving a set of data at a set of processors in a deep learning system, wherein the set of processors are configured in a tree topology including a root, parent nodes of respective branches, and child processors connecting to respective ones of the parent nodes;
    assigning target portions of the set of data to respective ones of the child processors;
    executing first reduce-scatter operations to cause child processors sharing a same parent node to exchange data items of the target portions, such that one child processor sharing the same parent node combines its own data items with date items received from one or more other child processors sharing the same parent node;
    executing second reduce-scatter operations to cause data item exchanges between child processors connecting to different parent nodes, such that the sets of data are combined across all of the child processors and each of the child processors in all the respective branches includes combined data; and
    using an all-gather algorithm for each of the child processors to gather the combined data of other child processors in all the respective branches, such that all the child processors include a complete set of the combined data for deep learning.

8. The computer program product of claim 7, wherein in executing the first reduce-scatter operations, exchanging the data items of the target portions between the child processors uses a ring algorithm.

9. The computer program product of claim 7, wherein, at a level of the parent nodes, distributing the target portions of the set of data to the child processors is based on degrees of the parent nodes; wherein, at a level of the root, distributing the target portions of the set of data to the child processors is based on degrees of the root.

10. The computer program product of claim 7, the method further comprising:
    assigning ranges of data item indices for the respective ones of the child processors; and
    wherein, in executing the second reduce-scatter operations, a first child processor connecting to a first parent node receives data items, from a second child processor connecting to a second parent node, date items that are within a range of the data item indices of the first child processor.

11. The computer program product of claim 7, wherein at least one processor of the set of processors is a graphic processing unit (GPU).

12. A deep learning system including a set of processors configured in a tree topology including a root, parent nodes of respective branches, and child processors connecting to respective ones of the parent nodes, wherein the set of processors is configured to implement a method for sending data across the set of processors to combine the data on the processors, the method comprising:
    receiving a set of data at the set of processors in a deep learning system;
    assigning target portions of the set of data to respective ones of the child processors;
    executing first reduce-scatter operations to cause child processors sharing a same parent node to exchange data items of the target portions, such that one child processor sharing the same parent node combines its own data items with date items received from one or more other child processors sharing the same parent node;
    executing second reduce-scatter operations to cause data item exchanges between child processors connecting to different parent nodes, such that the sets of data are combined across all of the child processors and each of the child processors in all the respective branches includes combined data; and
    using an all-gather algorithm for each of the child processors to gather the combined data of other child processors in all the respective branches, such that all the child processors include a complete set of the combined data for deep learning.

13. The deep learning system of claim 12, wherein in executing the first reduce-scatter operations, exchanging the data items of the target portions between the child processors uses a ring algorithm.

14. The deep learning system of claim 12, the method further comprising:
assigning ranges of data item indices for the respective ones of the child processors; and
wherein, in executing the second reduce-scatter operations, a first child processor connecting to a first parent node receives data items, from a second child processor connecting to a second parent node, date items that are within a range of the data item indices of the first child processor.

15. The deep learning system of claim 12, wherein at least one processor of the set of processors is a graphic processing unit (GPU).

16. The computer program product of claim 7, wherein, in executing the second reduce-scatter operations, exchanging the data items of the target portions between the child processors uses a hierarchical algorithm.

17. The deep learning system of claim 12, wherein, in executing the second reduce-scatter operations, exchanging the data items of the target portions between the child processors uses a hierarchical algorithm.

18. The deep learning system of claim 12, wherein, at a level of the parent nodes, distributing the target portions of the set of data to the child processors is based on degrees of the parent nodes; wherein, at a level of the root, distributing the target portions of the set of data to the child processors is based on degrees of the root.

* * * * *